US012596992B2

(12) United States Patent
Yang

(10) Patent No.: US 12,596,992 B2
(45) Date of Patent: Apr. 7, 2026

(54) ORDER RECHECKING DEVICE, ORDER RECHECKING SYSTEM AND ORDER RECHECKING METHOD

(71) Applicant: BEIJING JINGDONG ZHENSHI INFORMATION TECHNOLOGY CO., LTD., Beijing (CN)

(72) Inventor: Wenxiang Yang, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 546 days.

(21) Appl. No.: 17/998,311

(22) PCT Filed: Mar. 30, 2021

(86) PCT No.: PCT/CN2021/083965
§ 371 (c)(1),
(2) Date: Nov. 9, 2022

(87) PCT Pub. No.: WO2022/037073
PCT Pub. Date: Feb. 24, 2022

(65) Prior Publication Data
US 2023/0342719 A1 Oct. 26, 2023

(30) Foreign Application Priority Data
Aug. 18, 2020 (CN) .......................... 202010832026.8

(51) Int. Cl.
*G06Q 10/0875* (2023.01)
*B65G 1/137* (2006.01)
(52) U.S. Cl.
CPC ....... *G06Q 10/0875* (2013.01); *B65G 1/1378* (2013.01)

(58) Field of Classification Search
CPC .......................... G06Q 10/0875; B65G 1/1378
See application file for complete search history.

(56) References Cited

U.S. PATENT DOCUMENTS 6,762,681 B1 7/2004 Danelski
2003/0156427 A1 8/2003 Robey
(Continued)

FOREIGN PATENT DOCUMENTS

CN 203108812 U 8/2013
CN 104463655 A 3/2015
(Continued)

OTHER PUBLICATIONS

"Communication with Supplementary European Search Report", EP Application No. 21857175.0, Mar. 28, 2024, 8 pp.
(Continued)

*Primary Examiner* — Florian M Zeender
*Assistant Examiner* — Kimberly S. Bursum
(74) *Attorney, Agent, or Firm* — Myers Bigel, P.A.

(57) ABSTRACT

The present disclosure provides an order rechecking device, an order rechecking system, and an order rechecking method. The order rechecking device includes at least one shelving unit, where the shelving unit includes a shelf including a plurality of storage locations for placing goods; and a plurality of information interaction apparatuses that are in one-to-one correspondence to the plurality of storage locations, where the information interaction apparatus comprises at least one of interaction units for performing information interaction with the outside, and the interaction unit includes a signal connection part for signal connection to a controller and an information prompting part for sending out prompt information according to an instruction from the controller. Technical solutions of the present disclosure help to improve rechecking flexibility and efficiency.

17 Claims, 9 Drawing Sheets

(56) References Cited

U.S. PATENT DOCUMENTS

| | | | |
|---|---|---|---|
| 2004/0088229 A1 | 5/2004 | Xu | |
| 2007/0050080 A1* | 3/2007 | Peck | B65G 1/137 |
| | | | 700/214 |
| 2015/0294260 A1* | 10/2015 | Napoli | G06Q 10/083 |
| | | | 705/337 |
| 2016/0145044 A1 | 5/2016 | Mountz et al. | |
| 2017/0270754 A1 | 9/2017 | Ning et al. | |
| 2018/0286002 A1* | 10/2018 | Peck | B65G 1/1371 |
| 2020/0265380 A1* | 8/2020 | Dubois | G06Q 10/0835 |
| 2021/0276804 A1* | 9/2021 | Peck | B65G 1/137 |

FOREIGN PATENT DOCUMENTS

| | | | |
|---|---|---|---|
| CN | 104504358 A | | 4/2015 |
| CN | 104866995 A | | 8/2015 |
| CN | 104978646 A | | 10/2015 |
| CN | 206203301 U | | 5/2017 |
| CN | 206537814 U | | 10/2017 |
| CN | 206827450 | * | 1/2018 |
| CN | 206827450 U | | 1/2018 |
| CN | 110002167 A | | 7/2019 |
| CN | 110758974 A | | 2/2020 |
| CN | 111415111 A | | 7/2020 |
| CN | 111652560 A | | 9/2020 |
| CN | 111924398 A | | 11/2020 |
| JP | H01172506 U | | 12/1989 |
| JP | H04209112 A | | 7/1992 |
| JP | H09221207 A | | 8/1997 |
| JP | 2004307112 A | | 11/2004 |
| JP | 2013144605 A | | 7/2013 |
| JP | 5815998 B2 | | 10/2015 |
| JP | 2016088650 A | | 5/2016 |
| JP | 2020033166 A | | 3/2020 |

OTHER PUBLICATIONS

"First Office Action", CN Application No. 202010832026.8, Jun. 18, 2021, 13 pp.

"International Search Report and Written Opinion of the International Searching Authority (with English language translation)", International Application No. PCT/CN2021/083965, Jul. 9, 2021, 16 pp.

"Second Office Action", CN Application No. 202010832026.8, Aug. 20, 2021, 13 pp.

"Third Office Action", CN Application No. 202010832026.8, Oct. 9, 2021, 6 pp.

"Notice of Reasons for Refusal and English language translation", JP Application No. 2022-564624, Mar. 4, 2025, 24 pp.

Decision to Grant a Patent and English translation, JP Application No. 2022-564624, Jul. 1, 2025, 5 pp.

* cited by examiner

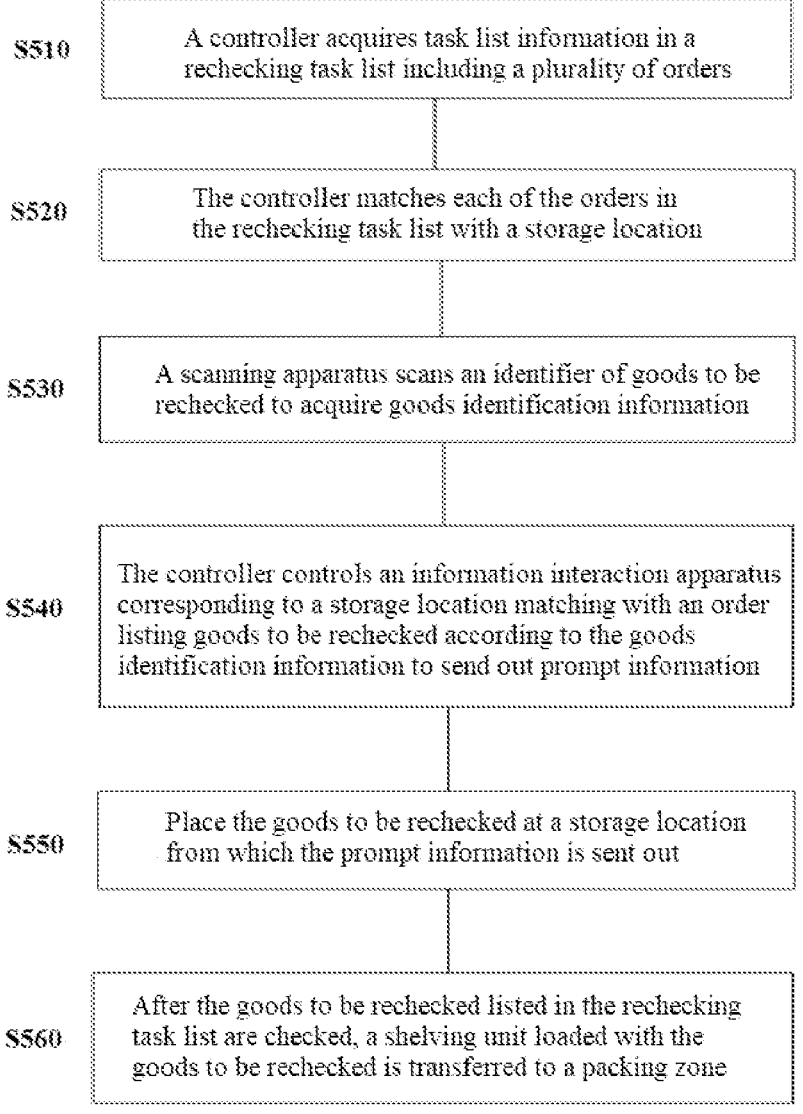

S510   A controller acquires task list information in a rechecking task list including a plurality of orders S520   The controller matches each of the orders in the rechecking task list with a storage location S530   A scanning apparatus scans an identifier of goods to be rechecked to acquire goods identification information S540   The controller controls an information interaction apparatus corresponding to a storage location matching with an order listing goods to be rechecked according to the goods identification information to send out prompt information S550   Place the goods to be rechecked at a storage location from which the prompt information is sent out S560   After the goods to be rechecked listed in the rechecking task list are checked, a shelving unit loaded with the goods to be rechecked is transferred to a packing zone

Fig. 14

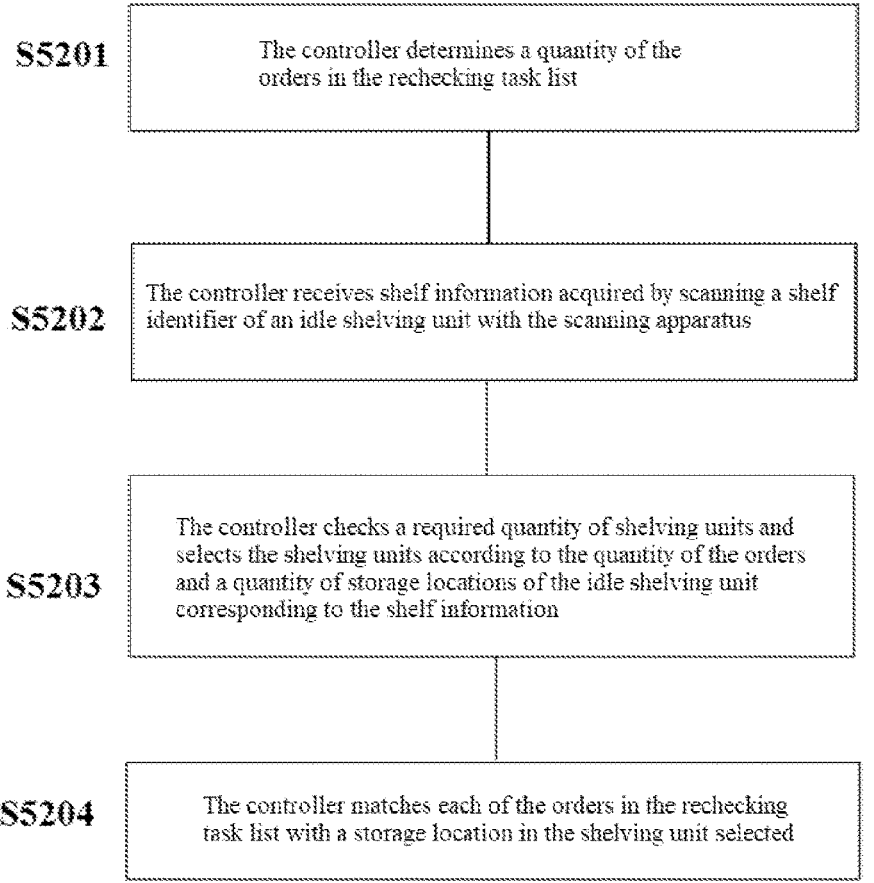

S5201 — The controller determines a quantity of the orders in the rechecking task list S5202 — The controller receives shelf information acquired by scanning a shelf identifier of an idle shelving unit with the scanning apparatus S5203 — The controller checks a required quantity of shelving units and selects the shelving units according to the quantity of the orders and a quantity of storage locations of the idle shelving unit corresponding to the shelf information S5204 — The controller matches each of the orders in the rechecking task list with a storage location in the shelving unit selected

Fig. 15

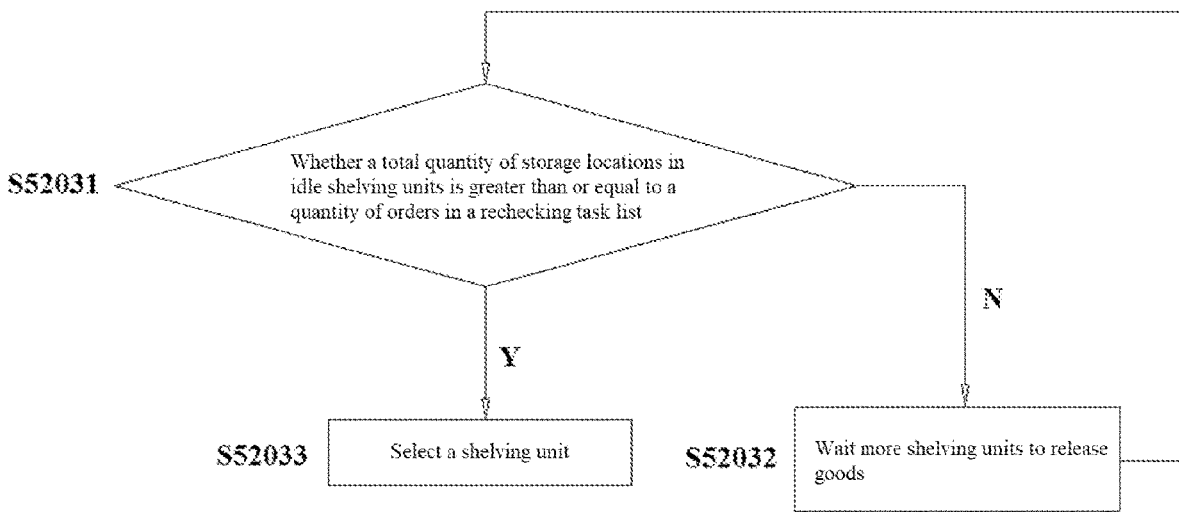

S52031 — Whether a total quantity of storage locations in idle shelving units is greater than or equal to a quantity of orders in a rechecking task list

Y

N

S52033 — Select a shelving unit

S52032 — Wait more shelving units to release goods

Fig. 16

S52041    A scanning apparatus scans a storage location identifier corresponding to a storage location of a shelving unit selected to acquire storage location identification information S52042    A controller matches each of orders in a rechecking task list with a storage location according to the storage location identification information

ORDER RECHECKING DEVICE, ORDER RECHECKING SYSTEM AND ORDER RECHECKING METHOD

CROSS-REFERENCE TO RELATED APPLICATIONS

The present application is a U.S. National Stage Application under 35 U.S.C. § 371 of International Patent Application PCT/CN2021/083965, filed on Mar. 30, 2021, which itself claims priority to Chinese Patent Application No. 202010832026.8, filed on Aug. 18, 2020 and entitled "ORDER RECHECKING DEVICE, ORDER RECHECKING SYSTEM AND ORDER RECHECKING METHOD", the disclosures of both of which are hereby incorporated by reference in their entireties.

FIELD OF THE INVENTION

The present disclosure relates to the field of logistics technologies, in particular to an order rechecking device, an order rechecking system, and an order rechecking method.

BACKGROUND OF THE INVENTION

With the rapid development of e-commerce, the number of daily orders in warehouses is increasing. Before delivery, multiple goods ordered in an order need to be packed into a package, and then are delivered by a delivery staff. A common processing procedure is that a rechecking task list is generated based on several orders, and all goods corresponding to these orders is listed in the rechecking task list. Rechecking operators pick goods according to goods listed in the rechecking task list. At the point, there is a large quantity of goods, and the goods can be transferred to rechecking zones by goods picking vehicles to prepare rechecking. Rechecking goods in warehouses is a key of warehouse operation. A rechecking objective is to distinguish goods listed in rechecking task lists according to orders to together place multiple goods listed in each order. Generally, multiple goods listed in each order are placed into a same turnover box, to make preparations for packing and delivery of the goods listed in each order. As customers have a gradually increased requirement for logistics timeliness, improving rechecking efficiency in warehouses has become a crucial link to improve the efficiency of an overall supply chain.

In related technologies well known by inventors, there are generally two order rechecking methods:

In an order rechecking method, an order rechecking system used mainly includes an electronic tag disposed on a turnover box and an RFID (Radio Frequency Identification) reader disposed at a storage location; and the electronic tag on the turnover box, storage location number, and order information are bound separately, and the electronic tag is used to prompt storage location information of corresponding goods.

In another order rechecking method, each storage location in a rechecking shelf is pasted with a bar code, and each turnover box is provided with the bar code. Before rechecking, storage location bar code information, bar code number on turnover box and order information are bound separately. When goods are scanned each time, storage location number corresponding to the goods is prompted by a display screen, and the goods are placed in a turnover box corresponding to rechecking storage location, and then the storage location bar code is scanned for verification. The above operations stop until all goods are rechecked.

SUMMARY OF THE INVENTION

An object of the present disclosure is to provide an order rechecking system, an order rechecking system, and an order rechecking method.

A first aspect of the present disclosure provides an order rechecking device, including at least one shelving unit, where the shelving unit includes:

a shelf including a plurality of storage locations for placing goods; and a plurality of information interaction apparatuses that are in one-to-one correspondence to the plurality of storage locations, where the information interaction apparatus includes at least one of interaction units configured to perform information interaction with the outside, and the interaction unit includes a signal connection part configured to be in signal connection to a controller and an information prompting part configured to send out prompt information according to an instruction from the controller.

In some embodiments, the information interaction apparatus includes two or more of the interaction units.

In some embodiments, the shelving unit further includes a shelf identifier configured to identify the shelving unit.

In some embodiment, the shelving unit further includes a plurality of storage location identifiers, and the plurality of storage location identifiers are in one-to-one correspondence to the plurality of storage locations, and are configured to identify corresponding storage locations.

In some embodiments, the shelf includes a baffling part that is disposed between two adjacent storage locations so as to partition the two storage locations, and a position of the baffling part is adjustable to adjust spaces of the two adjacent storage locations.

In some embodiments, the order rechecking device further includes a shelf shifting apparatus configured to drive the shelving unit to move along a predetermined route.

In some embodiments, the shelf shifting apparatus includes:

a driving apparatus in driving connection to the shelving unit; and a rail on which the shelving unit is arranged and along which the shelving unit is movable.

In some embodiments, the rail is a closed rail.

In some embodiments, the rail is located above the shelving unit, and the shelving unit is suspended on the rail; and/or the rail is located below the shelving unit, and the shelving unit is supported on the rail.

In some embodiments, the shelf shifting apparatus further includes a transmission device, the transmission device is connected between the driving apparatus and the shelving unit, and the driving apparatus drives the shelving unit to move via the transmission device.

In some embodiments, the transmission device includes:

a driving sprocket connected to the driving apparatus;

a driven sprocket, where the rotation axis of the driven sprocket and the rotation axis of the driving sprocket are spaced in parallel; and a transmission chain mounted on the driving sprocket and the driven sprocket and arranged along the rail, where the shelving unit is connected to the transmission chain.

In some embodiments, the shelf shifting apparatus includes a suspension assembly, and the shelving unit is moveably suspended on the rail via the suspension assembly.

In some embodiments, the suspension assembly includes a guide pulley fitting with the rail, and the shelving unit is suspended on the rail via the guide pulley.

A second aspect of the present disclosure provides an order rechecking system, including:

an order rechecking device being the foregoing order rechecking device;

a scanning apparatus configured to scan an identifier of goods to be rechecked to acquire goods identification information; and a controller in signal connection to the information interaction apparatus and the scanning apparatus, where the controller is configured to: acquire task list information in a rechecking task list including a plurality of orders; match each of the plurality of orders in the rechecking task list with a storage location; and control the information prompting part of the information interaction apparatus corresponding to the storage location matching with the order listing goods to be rechecked according to the goods identification information to send out prompt information.

In some embodiments, the scanning apparatus is further configured to scan a task list identifier of the rechecking task list to acquire the task list information, where the controller acquires the task list information from the scanning apparatus.

In some embodiments, each of the information interaction apparatuses includes two or more of the interaction units; and the order rechecking system includes two or more of the scanning apparatuses, where the scanning apparatuses are respectively corresponding to two or more of the interaction units in the information interaction apparatuses corresponding to the storage locations, and the controller is configured to control the information prompting part of the interaction unit corresponding to the scanning apparatus which sends out the goods identification information to send out the prompt information.

In some embodiments, the order rechecking system further includes:

a packing table configured for packing the goods in the storage locations to form a package; and a conveyor line configured to convey the package.

A third aspect of the present disclosure provides an order rechecking method, including:

Step S510, acquiring, by a controller, task list information in a rechecking task list including a plurality of orders;

Step S520, matching, by the controller, each of the plurality of orders in the rechecking task list with a storage location;

Step S530, scanning, by a scanning apparatus, an identifier of goods to be rechecked to acquire goods identification information;

Step S540, controlling, by the controller, an information prompting part of an information interaction apparatus corresponding to the storage location matching with the order listing the goods to be rechecked according to the goods identification information to send out prompt information; and Step S550, placing the goods to be rechecked at the storage location corresponding to the information interaction apparatus which sends out the prompt information.

In some embodiments, the order rechecking method further includes Step S500, scanning, by the scanning apparatus, a task list identifier of the rechecking task list to acquire the task list information, where in Step S510, the controller acquires the task list information from the scanning apparatus.

In some embodiments, Step S520 includes:

Step S5201, determining, by the controller, a quantity of the orders in the rechecking task list;

Step S5202, acquiring, by the controller, shelf information acquired by scanning a shelf identifier of an idle shelving unit with the scanning apparatus;

Step S5203, checking a required quantity of shelving units and selecting the shelving units by the controller according to the quantity of the orders and a quantity of storage locations of the idle shelving unit corresponding to the shelf information; and Step S5204, matching, by the controller, each of the plurality of orders in the rechecking task list with a storage location in the shelving unit selected.

In some embodiments, Step S5203 includes:

Step S52031, determining whether a quantity of storage locations in the idle shelving unit is greater than or equal to a quantity of the orders in the rechecking task list;

under the condition that a determining result is no, performing Step S52032: waiting more shelving units to release the goods, and then performing Step S52031;

under the condition that a determining result is yes, performing Step S52033: selecting the shelving unit.

In some embodiments, Step S5204 includes:

Step S52041, scanning, by the scanning apparatuses, a storage location identifier corresponding to a storage location of the shelving unit selected to acquire storage location identification information; and Step S52042, matching, by the controller, each of the plurality of orders in the rechecking task list with the storage location according to the storage location identification information.

In some embodiments, each of the information interaction apparatuses includes two or more of interaction units, and each of the interaction units is corresponding to one of the scanning apparatuses; in Step S540, the controller controls the information prompting part of the information interaction apparatuses corresponding to the interaction unit corresponding to the scanning apparatus which sends out the goods identification information to send out prompt information.

In some embodiments, Step S550 further includes: sending out, to the controller, verification information for verifying that the goods to be rechecked are placed at the storage location from which the prompt information is sent out.

In some embodiments, after the goods to be rechecked are placed at the storage location corresponding to the information interaction apparatus which sends out the prompt information, the verification information is sent out to the controller via the interaction unit which sends out the prompt information.

In some embodiments, Step S530, Step S540, and Step S550 are repeatedly performed before the goods to be rechecked listed in the rechecking task list are rechecked.

In some embodiments, the order rechecking method further includes Step S560, after the goods to be rechecked listed in the rechecking task list are rechecked, transferring the shelving unit loaded with the goods to be rechecked to a packing zone.

In some embodiments, in Step S560, a shelf shifting apparatus drives the shelving unit to reach the packing zone along a predetermined route.

In some embodiments, Step S560 includes: the shelf shifting apparatus including a driving motor, driving, by the driving motor, the shelving unit to move along the predetermined route; and detecting, by an encoder of the driving motor, whether the shelving unit moves to a designated position; if the shelving unit does not move to the designated position, controlling, by a motor controller, the driving motor to drive the shelving unit to reach the designated position; if the shelving unit moves to the designated position, going to Step S510 to recheck orders in a new rechecking task list.

The order rechecking device according to the present disclosure may be used together and interact information with a controller. The controller matches the storage locations according to the orders in the rechecking task list, and controls the interaction unit of the information interaction apparatus to send out the prompt information. Unlike the related art, it is unnecessary to bind electronic tags on turnover boxes, storage location numbers and order information in advance or to bind bar code information of storage locations and bar code numbers on the turnover boxes and order information. Therefore, this helps to improve rechecking flexibility and efficiency.

Other features and advantages of the present disclosure become apparent from the following detailed description of exemplary embodiments of the present disclosure with reference to the accompanying drawings.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings:

FIG. 14 is a flowchart of an order rechecking method according to an embodiment of the present disclosure.

FIG. 15 is a flowchart of Step S520 in the order rechecking method according to an embodiment of the present disclosure.

FIG. 16 is a flowchart of Step S203 in Step S520 in the order rechecking method according to an embodiment of the present disclosure.

DETAILED DESCRIPTION OF THE EMBODIMENTS

Figure 1:
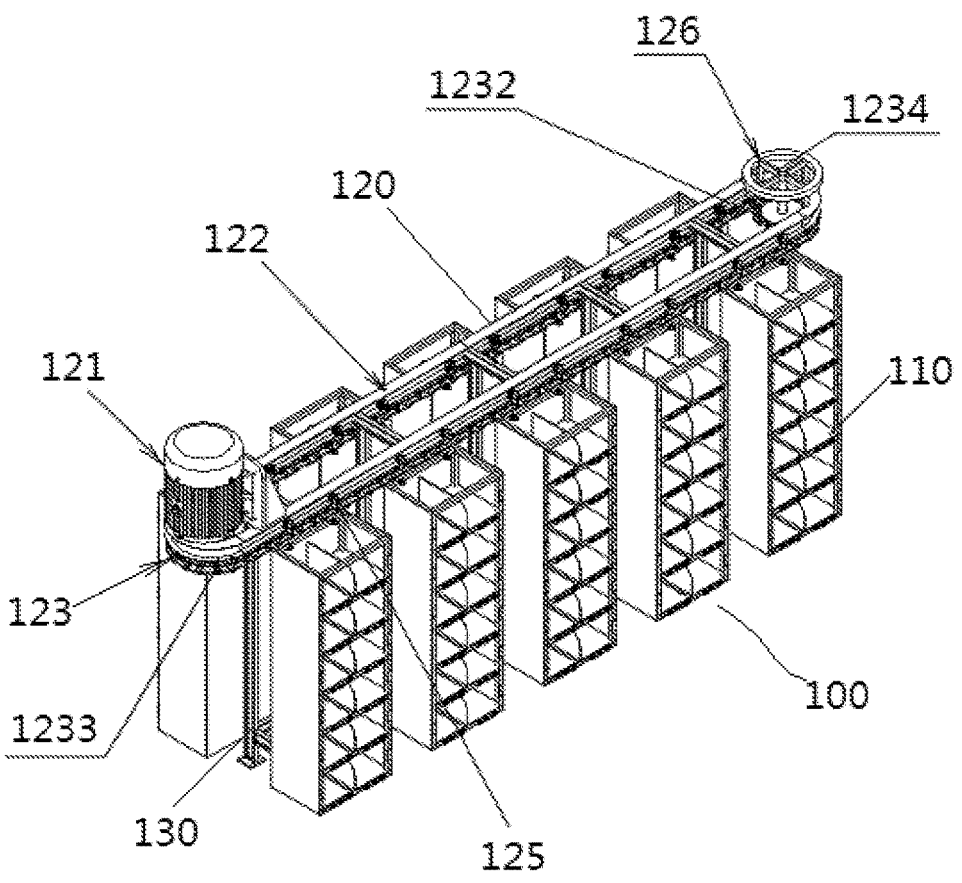
FIG. 1 is a structure diagram of an order rechecking device according to an embodiment of the present disclosure.
Figure 2:
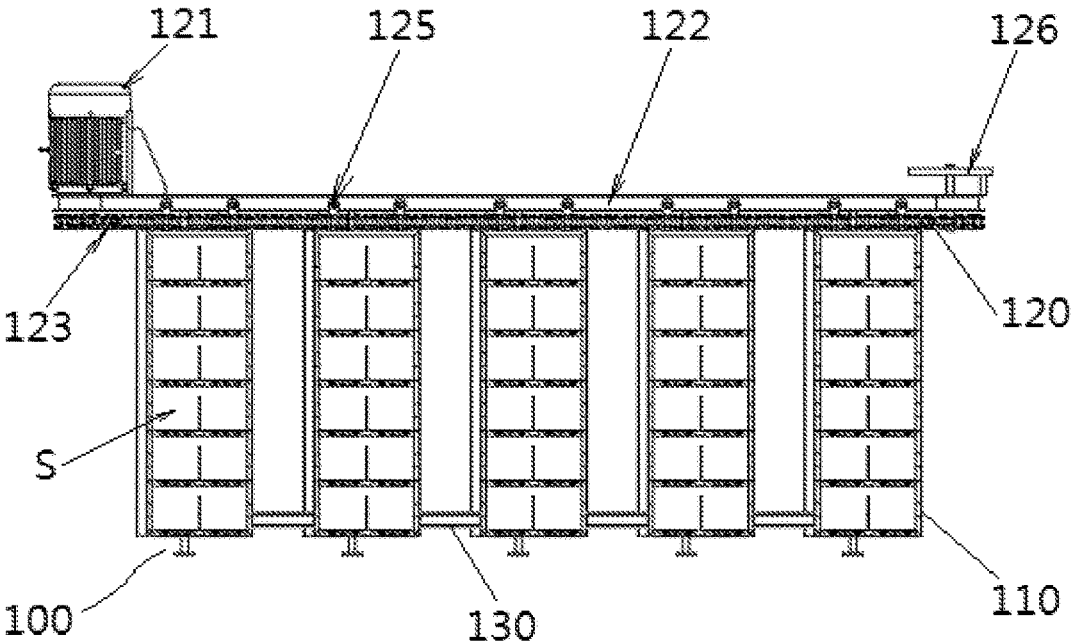
FIG. 2 is a front view structure diagram of the order rechecking device as shown in FIG. 1.
Figure 3:
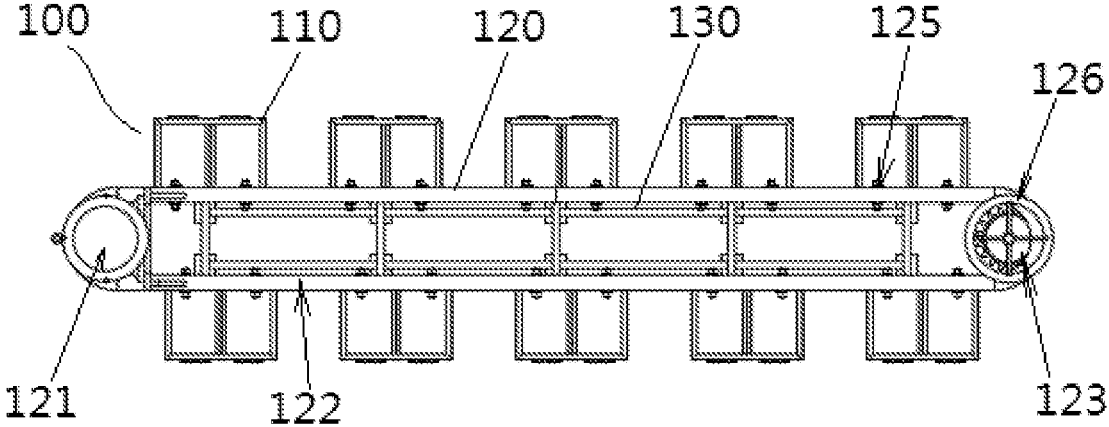
FIG. 3 is a top view structure diagram of the order rechecking device as shown in FIG. 1.
Figure 4:
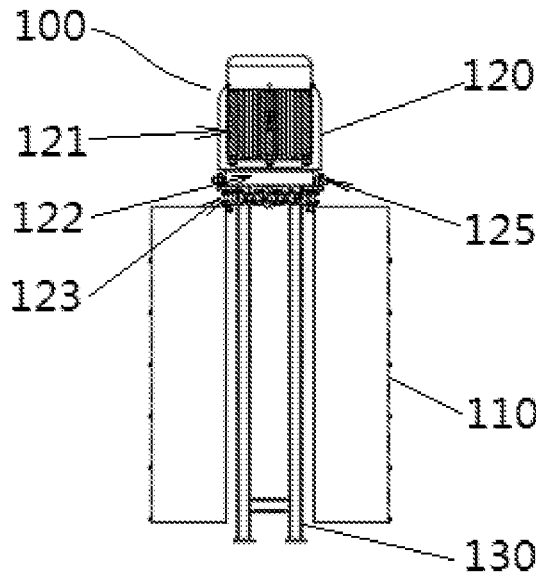
FIG. 4 is a side view structure diagram of the order rechecking device as shown in FIG. 1.

Technical solutions in the embodiments of the present disclosure will be described below clearly and completely in conjunction with the accompanying drawings in the embodiments of the present disclosure. Obviously, the described embodiments are only part of, instead of all of the embodiments of the present disclosure. The following description of at least one exemplary embodiment is merely illustrative and definitely is not construed as any limitation on the present application or on use of present application. Based on the embodiments of the present disclosure, all of other embodiments obtained by a person of ordinary skill in the art without creative work should fall into the protection scope of the present disclosure.

Unless otherwise specified, relative arrangements of components and steps, numerical expressions, and numerical values set forth in these embodiments do not constitute a limitation on the scope of the present application. Moreover, it should be understood that, for ease of description, sizes of various parts shown in the accompanying drawings are not drawn to scale. The technologies, methods, and devices known to those of ordinary skill in the related art may not be discussed in detail, but where appropriate, the technologies, methods, and devices should be regarded as being authorized as a part of the specification. In all examples shown and discussed herein, any specified value should be interpreted as merely illustrative, rather than restrictive. Therefore, other examples of the exemplary embodiments may have different values. It should be noted that similar reference signs and letters indicate similar items in the following drawings, and therefore once an item is defined in one drawing, it does not need to be further discussed in the subsequent drawings.

In the description of the present disclosure, it should be understood that, such as "first" and "second", are used to define parts and only for the ease of distinguishing the parts. Unless otherwise stated, the terms have no special meanings, and therefore cannot be understood as a limitation to the protection scope of the present disclosure.

In the description of the present disclosure, it should be understood that, the orientations or positional relationships indicated by the terms "front", "rear", "upper", "lower", "left", "right", as well as "transverse", "longitudinal", "vertical", "horizontal", "top", "bottom", and the like are based on the orientations or positional relationships shown in the accompanying drawings. Such terms are intended merely for the ease and brevity of description of the present disclosure without indicating or implying that the apparatuses or components mentioned thereto must have specified orientations or must be constructed and operated in the specified orientations, and therefore shall not be construed as any limitations on the protection scope of the present disclosure. The orientation terms "inside" and "outside" refer to the inside and outside relative to the profile of the components themselves.

As shown in FIG. 1 to FIG. 18, embodiments of the present disclosure provide an order rechecking device, an order rechecking system, and an order rechecking method.

As shown in FIG. 1 to FIG. 12, the order rechecking device 100 according to the embodiments of the present disclosure mainly includes at least one shelving unit 110. For example, as shown in FIG. 1, the order rechecking device 100 includes 10 shelving units 110. In some embodiments not shown, one order rechecking device 100 may include less or more shelving units 110. For example, a quantity of the shelving units 110 may be 1, 3, 4, 8, 12, or the like.

As shown in FIG. 1 to FIG. 8, the shelving unit 110 mainly includes a shelf 111 and a plurality of information interaction apparatuses 113. The shelf 111 includes a plurality of storage locations S for placing goods. The plurality of information interaction apparatuses 113 are in one-to-one correspondence to the plurality of storage locations S, where the information interaction apparatus 113 includes at least one of interaction units for performing information interaction with the outside. For example, the at least one of interaction units includes a first interaction unit 1131 and a second interaction unit 1132. The interaction unit includes a signal connection part being in signal connection to a controller 200 and an information prompting part for sending out prompt information according to an instruction from the controller 200.

For example, the controller includes a computer equipped with a warehouse management system (Warehouse Management System, WMS).

The order rechecking device according to this embodiment may be used together and interact information with a controller. The controller matches the storage locations according to the orders in the rechecking task list, and controls the interaction unit of the information interaction apparatus to send out the prompt information. Unlike the related art, it is unnecessary to bind electronic tags on turnover boxes, storage location numbers and order information in advance or to bind bar code information of storage locations, bar code numbers on the turnover boxes and order information. Therefore, this helps to improve rechecking flexibility and efficiency.

As shown in FIG. 1 to FIG. 8, in this embodiment, the shelving unit 110 further includes a plurality of storage location identifiers 112, and the plurality of storage location identifiers 112 are in one-to-one correspondence to the plurality of storage locations S. The plurality of storage location identifiers 112 are disposed on the shelf 111 of the shelving unit 110. Each location identifier 112 contains information corresponding to the storage location S, and may be a two-dimensional code, a bar code, a radio frequency tag, or the like.

In some embodiments, the shelving unit 110 further includes a shelf identifier. The shelf identifier contains information corresponding to the shelving unit 110, and may be a two-dimensional code, a bar code, a radio frequency tag, or the like.

As shown in FIG. 1 to FIG. 8, the shelf 111 includes a frame 1111, a shelf plate 1112, a baffling part 1113, and an enclosing plate 1114.

The frame 1111 is cuboid-shaped and includes four uprights 1111A, two upper transverse end beams 1111B, two lower transverse end beams 1111B, two upper longitudinal end beams 1111C, two lower longitudinal end beams 1111C, and a plurality of intermediate beams 1111D that are respectively disposed on front and rear sides of the frame in layers. One shelf plate 1112 is disposed on a square frame enclosed by the two lower transverse end beams 1111B and the two lower longitudinal end beams 1111C. Other shelf plates 1112 are respectively disposed on two opposite intermediate beams D at the front and rear of each layer. The shelf plates 1112 partitions internal space of the shelf 111 into a plurality of storage layers.

The enclosing plate 1114 includes two lateral plates 1114A respectively disposed on left and right sides of the frame 1111 and a rear plate 1114B disposed at the rear side of the frame 1111.

Figure 5:
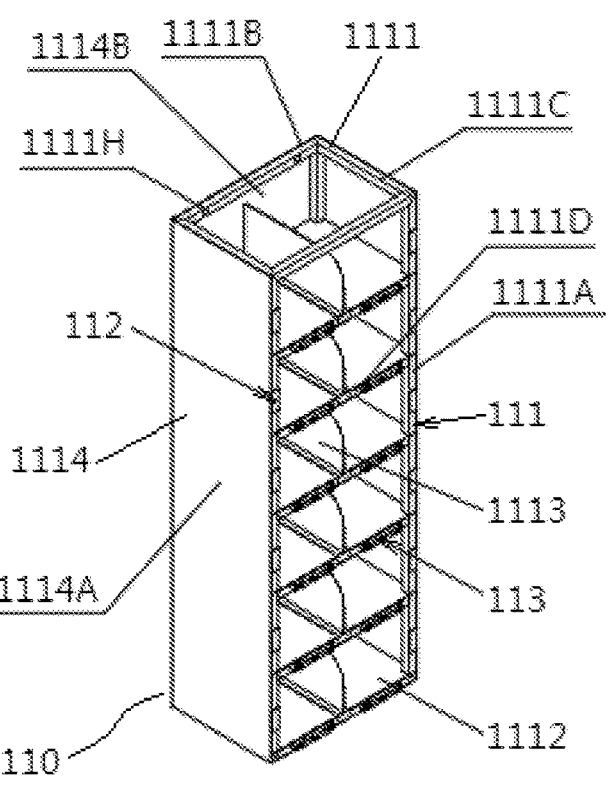
FIG. 5 is a structure diagram of a shelving unit in the order rechecking device as shown in FIG. 1.
Figure 6:
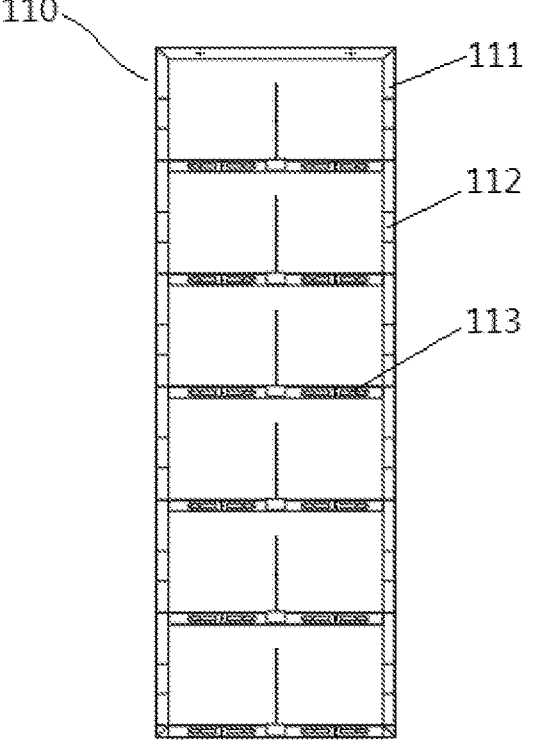
FIG. 6 is a front view structure diagram of the shelving unit as shown in FIG. 5.
Figure 7:
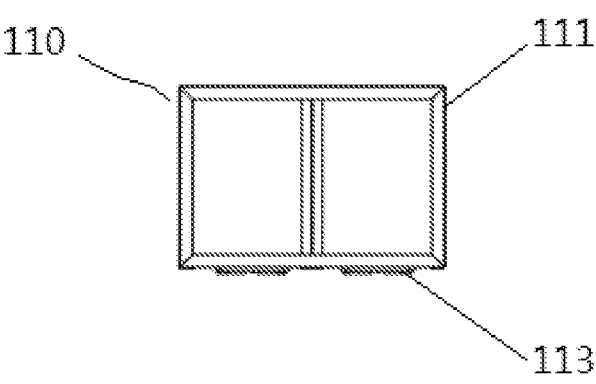
FIG. 7 is a top view structure diagram of the shelving unit as shown in FIG. 5.
Figure 8:
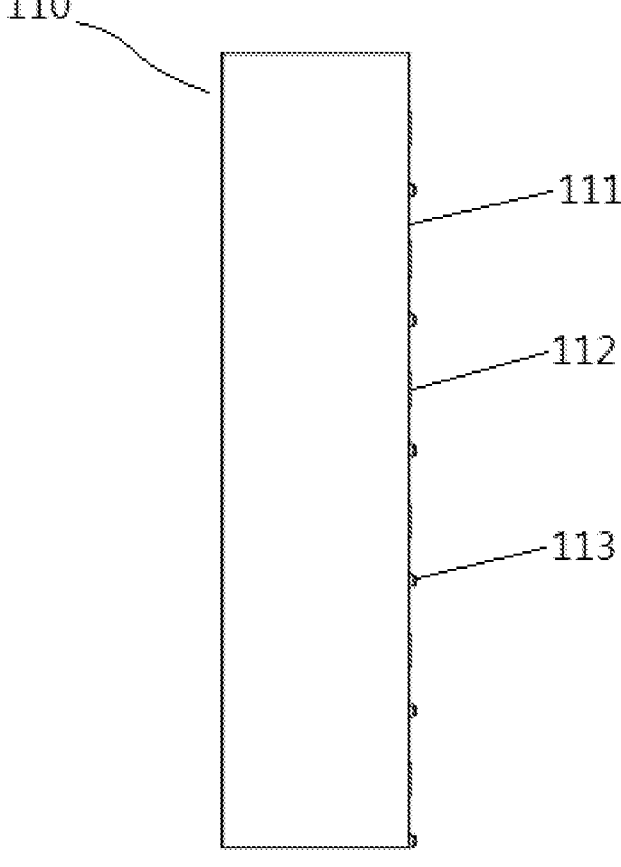
FIG. 8 is a side view structure diagram of the shelving unit as shown in FIG. 5.

As shown in FIG. 5, the upper transverse end beam 1111B at the top of the rear side of the frame 1111 is provided with a connecting hole 1111H. The connecting hole 1111H is applied to a shelf connecting rod of a suspension assembly 125 described below and configured for suspending the shelf unit 110 on a rail 122.

The baffling part 1113 is disposed in each storage layer and configured to partition the storage layer where the baffling part 1113 is arranged into different storage locations S. As shown in FIG. 1 and FIG. 2, FIG. 5 and FIG. 6, and FIG. 10, in some embodiments, the baffling part 1113 is disposed between two adjacent storage locations S so as to partition the two storage locations, and the baffling part 1113 is disposed in a variable position way to adjust space of the two adjacent storage locations S.

Figure 10:
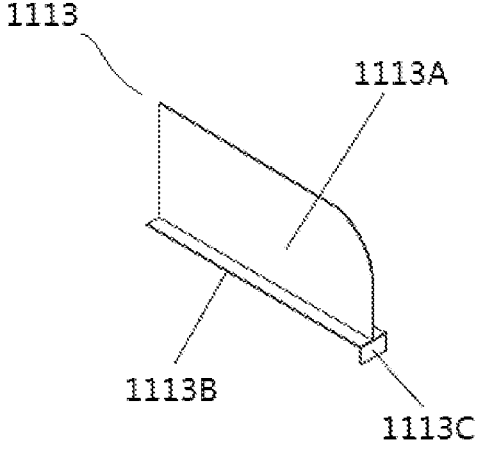
FIG. 10 is a structure diagram of a baffling part of the shelving unit in the order rechecking device as shown in FIG. 1.

As shown in FIG. 10, in some embodiments, the baffling part 1113 includes a baffle 1113A, a bottom plate 1113B, and a flanging plate 1113C. The bottom plate 1113B is strip-shaped, the length direction thereof is horizontally placed in a direction from the front to rear of the frame 1111, and the bottom plate 1113B is disposed on the shelf plate 1112 of the storage layer and is moveable along left-right direction. The baffle 1113A stands in the middle of the bottom plate 1113B and fixedly connected to the bottom plate 1113B. The flanging plate 1113C is connected to the front end of the bottom plate 1113B and extends downward from the front end edge of the bottom plate 1113. The bottom plate 1113B is placed on the shelf plate 1112 of the shelving unit 110 and configured for fixing and supporting the baffle 1113A. The flanging plate 1113C and the bottom plate 1113B form a perpendicular angle; the flanging plate 1113C and an edge of the bottom plate 1113B are together disposed on a corresponding intermediate beam 1111D or a transverse end beam 1111B to provide position limitation and fixation.

The baffling part 1113 is disposed on the shelf plate 1112 and is movable left and right to perform physical isolation on adjacent different storage locations S. In addition, space of each of the adjacent different storage locations S may be also properly adjusted. If space required of part of orders exceeds the volume of the storage location S, the volume of the storage location S corresponding to the order is increased by moving the baffling part 1113, to better fit with space required for goods listed in different orders.

In this embodiment, each storage layer is provided with only one baffling part 1113. In some embodiments not shown, each storage layer can be provided with more baffling parts 1113 to partition three or more storage locations S for each storage layer.

In addition, although the foregoing embodiments of the present disclosure only describe the baffling part 1113 on the same storage layer, and the baffling part adjusts space of the storage location by adjusting width of the storage location S. However, in some embodiments not shown, the baffling part may be also disposed between adjacent upper and lower storage locations S, and space of the storage location is adjusted by adjusting height of the storage location S.

Figure 9:
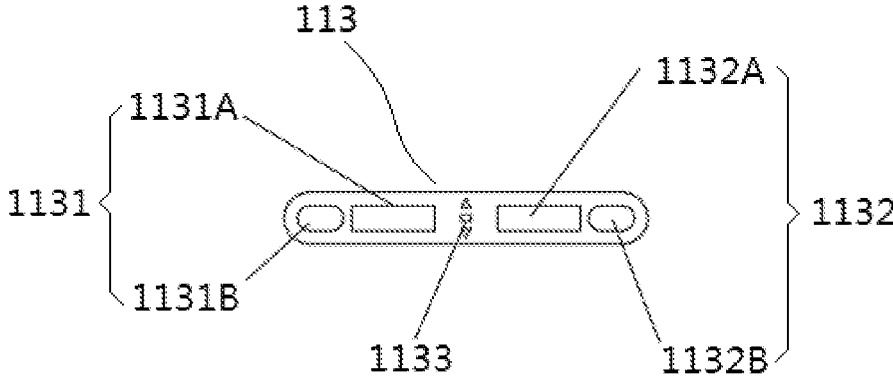
FIG. 9 is a structure diagram of an information interaction apparatus of the shelving unit in the order rechecking device as shown in FIG. 1.

As shown in FIG. 9, in some embodiments, each information interaction apparatus 113 includes two interaction units, namely the first interaction unit 1131 and the second interaction unit 1132. The first interaction unit includes a first display screen 1131A and a first button 1131B, and the second interaction unit includes a second display screen 1132A and a second button 1132B. In addition, each information interaction apparatus 113 may also include a function button set 1133. For example, the function button set 1133 may include a power button, up and down regulating buttons, and the like.

In this embodiment, each information interaction apparatus 113 includes two interaction units and can implement a single-person operation mode or a dual-person operation mode. In the single-person operation mode, only one interaction unit of the information interaction apparatus 113 is enabled. In the dual-person operation mode, the first interaction unit 1131 and the second interaction unit 1132 are enabled.

Each information interaction apparatus 113 is provided with two (or more) interaction units, helping to implement order recheck through flexible switching between the single-person operation mode and the dual-person operation mode (when the information interaction apparatus includes more interaction units, there may be a multi-person operation mode with more than three persons) according to different operation strengths, thereby reducing comprehensive cost.

The setting mode of the information interaction apparatus is not unique, and any information interaction apparatus capable of fulfilling functional requirements during order check can be used. For example, the interaction units of the interaction apparatus 113 may include a display light, a buzzer, a broadcasting apparatus, and other information prompting apparatuses.

As shown in FIG. 1 to FIG. 4, in some embodiments, the order rechecking device 100 further includes a shelf shifting apparatus 120 configured to drive the shelving unit 110 to move along a predetermined route.

The shelf shifting apparatus 120 is disposed to drive the shelving unit 110 to move along the predetermined route, so that the shelving unit 110 loaded with goods can be automatically transferred to other operation zones for subsequent operation. For example, the shelving unit can be transferred to the packing zone for packing, or the shelving unit 110 where the goods are unloaded can be automatically transferred from other operation zones to a rechecking zone to recheck a new rechecking task list. Therefore, this increases the automation level and deployment speed of the order rechecking device, helping to improve the recheck efficiency.

As shown in FIG. 1 to FIG. 4, the shelf shifting apparatus 120 includes a driving apparatus 121 and a rail 122. The driving apparatus 121 is in driving connection to the shelving unit 110. The shelving unit 110 is disposed on the rail 122 and moves along the predetermined route determined by the rail 122. The driving apparatus 121 may be various devices capable of driving the shelving unit 110 to move along the predetermined route, such as a driving motor.

The shelf shifting apparatus is configured as a combination of the driving apparatus and the rail, and a moving path of the shelving unit 110 does not need to be specially controlled. This helps to accurately control loading or unloading positions of the shelving unit, thereby simplifying a control process.

As shown in FIG. 1 to FIG. 4, in some embodiments, the rail 122 is a closed rail. An encircling shape of the closed rail may be set according to field requirements. For example, such encircling shape may be an oblong shape, circular shape, etc. Certainly, in some embodiments not shown, the rail may be an open-loop rail, and in this case the shelving unit may reciprocate along the rail.

A cross-section shape of the closed rail may be set according to carrying requirements. For example, the closed rail may be an H-shaped rail, a grooved rail, etc.

The rail is configured as the closed rail so that the shelving unit 110 cyclically moves in related operation zones. This helps to reasonably arrange the related operation zones along the closed rail, reduce space occupied by the order rechecking device and the order rechecking system including the order rechecking device in overall, and shorten the route required for completing loading and unloading of goods by the order rechecking device once.

As shown in FIG. 1 to FIG. 4, the rail 122 may be located above the shelving unit 110 and the shelving unit 110 is suspended on the rail 122, so that the order rechecking device is formed as a suspended rechecking device.

In some embodiments not shown, the rail 22 may be also located below the shelving unit 110, and the rail 122 provides support for the shelving unit 110.

In some embodiments, the order rechecking device 100 further includes a transmission device 123, the transmission device 123 is connected between the driving apparatus 121 and the shelving unit 110, and the driving apparatus 121 drives the shelving unit 110 to move via the transmission device 123.

The transmission device 123 is disposed to more flexibly select and arrange the shelf shifting apparatus 120 and the driving apparatus 121. This also helps to drive a plurality of shelving unit 110 to move by using a same driving apparatus 121 according to set rules, for example, to drive the plurality of shelving unit 110 to move synchronously.

As shown in FIG. 1 to FIG. 4, in some embodiments, the transmission device 123 includes a driving sprocket (not marked due to hiding from view by the rail), a driven sprocket 1234, and a transmission chain 1233. The driving sprocket is connected to an output shaft of driving apparatus 121. The rotation axis of the driven sprocket 1234 and the rotation axis of the driving sprocket are spaced in parallel. The transmission chain 1233 is mounted on the driving sprocket and the driven sprocket 1234 and arranged along the rail 122, where the shelving unit 110 is connected to the transmission chain 1233.

As shown in FIG. 1 to FIG. 4, the order rechecking device 100 includes a support frame 130, where the support frame 130 includes a support girder, a lower connecting beam, a connecting beam, a short connecting beam, a motor mounting bracket, a fixing bottom plate, and the like, and is used for supporting the foregoing components of the order rechecking system. The rail 122 is fixedly mounted at the top of the support frame 130, and the driving apparatus 121 and the transmission device 123 are both mounted on the support frame 130 or the rail 122. For example, the shelf shifting apparatus 120 includes a shaft mounting bracket 126, where the shaft mounting bracket is disposed on the support frame 130, a rotating shaft of the driven sprocket 1234 is rotatably mounted on the shaft mounting bracket 126 so that the driven sprocket 1234 is mounted on the support frame 130. The driving apparatus 121 and the driving sprocket are mounted on the rail 122.

As shown in FIG. 1 to FIG. 4, and FIG. 11 and FIG. 12, the shelf shifting apparatus 120 includes a suspension assembly 125, and the shelving unit 110 is moveably suspended on the rail 122 via the suspension assembly 125.

Figure 11:
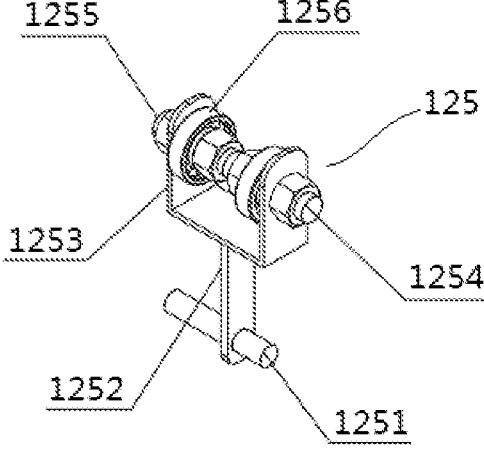
FIG. 11 is a structure diagram of a suspension assembly of a shelf shifting apparatus in the order rechecking device as shown in FIG. 1.
Figure 12:
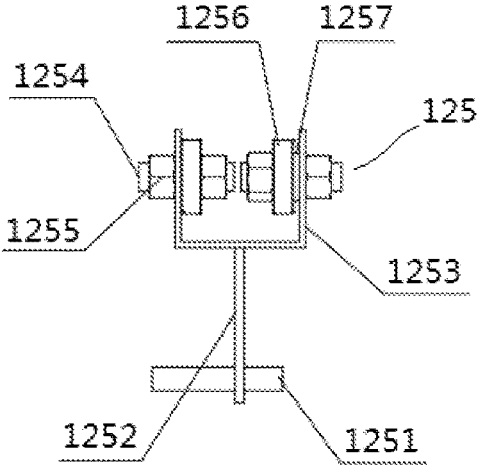
FIG. 12 is a front view structure diagram of the suspension assembly as shown in FIG. 11.

As shown in FIG. 11 and FIG. 12, in some embodiments, the suspension assembly 125 includes a guide pulley 1256 fitting with the rail 122, and the shelving unit 110 is suspended on the rail 122 via the guide pulley 1256.

As shown in FIG. 11 and FIG. 12, the suspension assembly 125 includes a shelf connecting rod 1251, a connecting plate 1252, a bending plate 1253, a fixing rod 1254, a fixing nut 1255, and the guide pulley 1256.

The shelf connecting rod 1251 fits with the connecting hole 1111H in the frame 1111 of the shelving unit 110 to connect the suspension assembly 125 and the shelving unit 110. After the shelf connecting rod 1251 fits with the connecting hole 1111H, the suspension assembly 125 and the shelving unit 110 may be locked together via a position locking member. For example, the position locking member may include a pin penetrating the shelf connecting rod 1251 along radial direction of the shelf connecting rod 1251 or a locking nut fitting with threads on the shelf connecting rod 1251. In addition, the transmission chain 1233 is provided with the connecting hole fitting with the shelf connecting rod 1251, and the shelf connecting rod 1251 penetrates the connecting hole in the transmission chain 1233, so that the transmission chain 1233 is hung on the rail 122 along the rail 122. The shelf connecting rod 1251 connects the transmission chain 1233 and the shelving unit 110, and the transmission chain 1233 moves to drive the shelving unit 110.

The connecting plate 1252 is connected between the shelf connecting rod 1251 and the bending plate 1253. The shelf connecting rod 1251 penetrates the connecting plate 1252. The bending plate 1253 is a U-shaped bending plate, including a transverse plate at the bottom and upward extension wings at both ends of the transverse plate. The connecting plate 1252 is connected to the middle position of the bottom of the transverse plate. Two fixing rods 1254 respectively penetrate two wings, and two guide pulleys 1256 are rotatably mounted on the two fixing rods 1254. The fixing nut 1255 is screwed onto two ends of the fixing rod 1254, and the guide pulleys 1256 are axially limited onto the fixing rod. When the suspension assembly 125 and the rail are assembled, the two guide pulleys 1256 are disposed on the lower transverse plate of the H-shaped rail and respectively located on two sides of the longitudinal plate of the H-shaped rail.

For example, the guide pulley 1256 may be a bearing. A shaft shoulder may be also disposed between the guide pulley 1256 and the bending plate to make the corresponding outer end of the inner ring of the guide pulley 1256 abut against the shaft shoulder, helping the outer ring of the guide pulley 1256 to avoid the surrounding structural member so as to smoothly rotate the outer ring of the guide pulley 1256 with respect to the inner ring.

As shown in FIG. 5, in this embodiment, the frame 1111 is provided with two connecting holes 1111H. To be specific, each shelving unit 110 is connected to two suspension assemblies 125 and suspended on the rail 122 through the two suspension assemblies 125. A quantity of the suspension assemblies 125 fitting with each shelving unit 110 is not limited to two, and may be set to more or less according to strength, stability, or the like.

Figure 13:
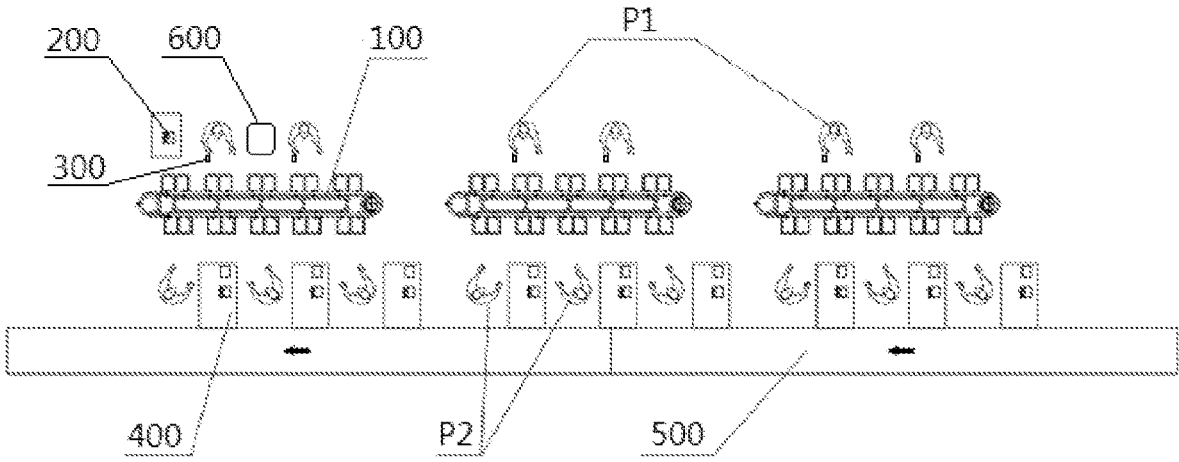
FIG. 13 is a structure diagram of an order rechecking system according to an embodiment of the present disclosure.

FIG. 13 is a structure diagram of an order rechecking system according to an embodiment of the present disclosure. The order rechecking system mainly includes an order rechecking device 100, a controller 200, and a scanning apparatus 300. The order rechecking device 100 is the order rechecking device according to the foregoing embodiments.

In some embodiments, the order rechecking system further includes a packing table 400 and a conveyor line 500. The order rechecking system may include one or more order rechecking devices 100. The controller 200, the scanning apparatus 300, the packing table 400, and the conveyor line 500 may be in support of the order rechecking device 100 according to the demands for order check, for example, may be correspondingly provided in one or more.

The controller 200 is in signal connection to the information interaction apparatus 113 of the order rechecking device 100. The scanning apparatus 300 is in signal connection to the controller 200.

The scanning apparatus 300 is configured to scan an identifier of goods to be rechecked to acquire goods identification information. The controller 200 is configured to: acquire task list information in a rechecking task list including a plurality of orders; match each of the plurality of orders in the rechecking task list with a storage locations S; and control the information prompting part of the information interaction apparatus 113 corresponding to the storage location S matching with the order listing goods to be rechecked according to the goods identification information to send out prompt information.

The order checking system according to the embodiments of the present disclosure has advantages of the foregoing order rechecking device.

In some embodiments, each information interaction apparatus 113 includes two or more of the interaction units 1131, 1132; the order rechecking system includes two or more scanning apparatuses 300, where the scanning apparatuses 300 are respectively corresponding to two or more of the interaction units in the information interaction apparatuses 113 corresponding to the storage locations S, and the controller 200 is configured to control the information prompting parts of the interaction units 1131, 1132 corresponding to the scanning apparatuses 300 sending out the goods identification information to send out the prompt information. For example, the two or more of the interaction units include a first interaction unit 1131 and a second interaction unit 1132.

In some embodiments, the scanning apparatus 300 is further configured to scan a task list identifier of the rechecking task list to acquire the task list information. The controller 200 acquires the task list information from the scanning apparatus 300. Certainly, the controller 200 may also acquire the task list information by using other ways, for example, receive rechecking task list information from other operation links, manually input task list numbers, and invoke a quantity of orders in a corresponding rechecking task list, goods listed in the orders, and other task list information according to the task list numbers. The packing table 400 is configured for packing the goods in the storage locations S of the shelving unit 110 loaded with the goods to form a package. The conveyor line 500 is configured for conveying the package.

In addition, as shown in FIG. 14, an embodiment of the present disclosure further provides an order rechecking method, including:

Step S510: a controller 200 acquires task list information in a rechecking task list including a plurality of orders. The task list information includes, for example, task list numbers, and order numbers and corresponding goods in plurality of orders in the rechecking task list.

Step S520: the controller 200 matches each of the orders in the rechecking task list with a storage locations S.

Step S530: the scanning apparatus 300 scans an identifier of goods to be rechecked to acquire goods identification information.

Step S540: the controller 200 controls the information prompting part of the information interaction apparatus 113 corresponding to the storage location S matching with the order listing the goods to be rechecked according to the goods identification information to send out prompt information.

Step S550: place the goods to be rechecked at the storage location S from which the prompt information is sent out.

In some embodiments, the order rechecking method further includes Step S500: The scanning apparatus 300 scans a task list identifier of the rechecking task list to acquire the task list information. In Step S510, the controller 200 acquires the required task list information from the scanning apparatus 300.

In some embodiments, Step S520 includes:

Step S5201: the controller 200 determines a quantity of the orders in the rechecking task list.

Step S5202: the controller 200 acquires shelf information acquired by scanning a shelf identifier of an idle shelving unit 110 with the scanning apparatus 300.

Step S5203: the controller 200 checks a required quantity of shelving units 110 and selects the shelving units 110 according to the quantity of the orders and a quantity of storage locations of the idle shelving unit 110 corresponding to the shelf information.

Step S5204: the controller 200 matches each of the plurality of orders in the rechecking task list with a storage locations S in the shelving unit 110 selected.

As shown in FIG. 16, in some embodiments, Step S5203 includes:

Step S52031: determine whether a quantity of storage locations in the idle shelving unit 110 is greater than or equal to a quantity of the orders in the rechecking task list.

Under the condition that a determining result is no, perform Step S52032: wait more shelving units 110 to release the goods, and then perform Step S52031 again.

Under the condition that a determining result is yes, perform Step S52033: select the shelving unit 110.

Figure 17:
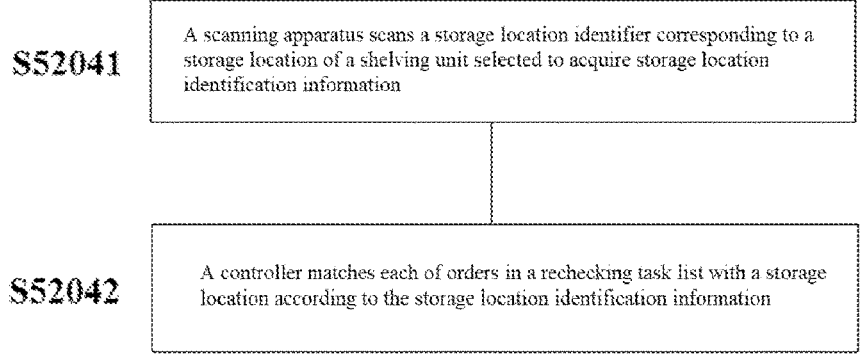
FIG. 17 is a flowchart of Step S204 in Step S520 in the order rechecking method according to an embodiment of the present disclosure.

As shown in FIG. 17, in some embodiments, Step S5204 includes:

Step S52041: The scanning apparatuses 300 scans a storage location identifier 112 corresponding to a storage location S of the shelving unit 110 selected to acquire storage location identification information.

Step S52042: The controller 200 matches each of the plurality of orders in the rechecking task list the storage location S according to the storage location identification information.

In some embodiments, each of the information interaction apparatuses 113 includes two or more of interaction units, and each of the interaction units is corresponding to one of the scanning apparatuses 300; in Step S540, the controller 200 controls the interaction unit corresponding to the scanning apparatus 300 sending out the goods identification information to send out prompt information.

In some embodiments, Step S550 further includes: verification information for verifying that the goods to be rechecked are placed at the storage location S from which the prompt information is sent out to the controller 200. For example, after the goods to be rechecked are placed at the storage location S corresponding to the information interaction apparatus sending out the prompt information, the verification information is sent out to the controller 200 via the interaction unit of the information interaction apparatus. For example, the verification information may be sent out to the controller 200 via the touch panel and button of the interaction unit, and the like.

In some embodiments, Step S530, Step S540, and Step S550 are repeatedly performed before the goods to be rechecked listed in the rechecking task list are rechecked.

As shown in FIG. 14, in some embodiments, the order rechecking method further includes Step S560: After the goods to be rechecked listed in the rechecking task list are checked, transfer the shelving unit 110 loaded with the goods to be rechecked to a packing zone.

In some embodiments, in Step S560, a shelf shifting apparatus 120 drives the shelving unit 110 to reach the packing zone along a predetermined route.

In some embodiments, the shelf shifting apparatus 120 includes a driving motor; Step S560 includes: the driving motor drives the shelving unit 110 to move along the predetermined route; and an encoder of the driving motor detects whether the shelving unit 110 moves to a designated position; if the shelving unit 110 does not move to the designated position, a motor controller controls the driving motor to drive the shelving unit 110 to reach the designated position; if the shelving unit 110 moves to the designated position, go to Step S510 to recheck orders in a new rechecking task list.

The following describes specific operation steps of the order rechecking method in the embodiments of the present disclosure with reference to FIG. 13 to FIG. 18.

Step S510: a controller 200 acquires task list information in a rechecking task list including a plurality of orders. A rechecking operator P1 scans the rechecking task list with a hand-held scanning apparatus 300 to acquire task list information such as task list numbers. The rechecking operator P1 can log into the scanning apparatus 300 via an account number. Generally, when picking is performed at a front end, a container number and a rechecking task list number are bound. Thus, after scanning the rechecking task list, the scanning apparatus 300 uploads the task list information to the controller 200, and the controller 200 acquires the task list information in the rechecking task list. The scanning apparatus 300 may be a hand-held device for scanning, and the scanning is mainly performed by identifying bar codes or chips via laser heads, infrared heads, self-sensing devices, and the like provided in the scanning apparatus.

Step S520: the controller 200 matches each of the plurality of orders in the rechecking task list with a storage locations S. The controller 200 acquires shelf information acquired when the scanning apparatus 300 scans a shelf identifier of an idle shelving unit 110. The controller 200 checks a required quantity of shelving units 110 and selects the shelving units 110 according to the quantity of the orders and a quantity of storage locations of the idle shelving unit 110 corresponding to the shelf information. It is determined that whether a quantity of storage locations in the idle shelving unit 110 is greater than or equal to a quantity of the orders in the rechecking task list; under the condition that a determining result is no, more shelving units 110 are waited for releasing the goods, and then it is redetermined that whether a quantity of storage locations in the idle shelving unit 110 is greater than or equal to a quantity of the orders in the rechecking task list; under the condition that a determining result is yes, the shelving unit 110 is selected. The controller 200 matches each of the plurality of orders in the rechecking task list with a storage locations S in the shelving unit 110 selected. The scanning apparatuses 300 scans a storage location identifier 112 corresponding to a storage location S of the shelving unit 110 selected to acquire storage location identification information. The controller 200 matches each of the plurality of orders in the rechecking task list with the storage location S according to the storage location identification information. For example, in this step, the rechecking operator P1 may scan the shelf identifiers of the idle shelving units 110 through the scanning apparatus 300 to acquire shelf bar code numbers, and check a quantity t of required shelving units 110 according to a quantity n of orders and a quantity m of storage locations in the shelving units 110. For example, if the rechecking task list includes n=40 orders and the shelving units 110 corresponding to all shelf bar code numbers include m=12 storage locations S, a required quantity of shelving units is t=4.

Step S530: The scanning apparatus 300 scans an identifier of goods to be rechecked to acquire goods identification information. The rechecking operator P1 scans goods bar codes by using a corresponding scanning apparatus 300. A quantity of rechecking operators P1 and a quantity of corresponding scanning apparatuses 300 may be the same as or less than a quantity of interaction units of the information interaction apparatus. For example, in embodiments as shown in FIG. 1 to FIG. 13, each information interaction apparatus includes two interaction units, and selects a single-person operation mode or a dual-person operation mode for rechecking according to upstream and downstream operation efficiency of an operation site. The single-person operation mode and the dual-person operation mode are flexibly selected to satisfy different operation efficiency. When the overall workload is relatively low, the single-person operation mode is adopted to reduce personnel cost. When the overall workload is relatively heavy, the dual-person operation mode is adopted to match production.

Step S540: The controller 200 controls the information prompting part of the information interaction apparatus 113 corresponding to the storage location S matching with the order listing the goods to be rechecked according to the goods identification information to send out prompt information. In the single-person operation mode, after one rechecking operator P1 scans goods bar codes corresponding to goods, the information prompting part of the information interaction apparatus at the storage location S corresponding to the shelving unit 110 sends out prompt information, for example, a first button light is on. In the dual-person operation mode, after another rechecking operator P1 may simultaneously scan goods bar codes corresponding to other goods listed in the rechecking task list, the information prompting part at the storage location S corresponding to the shelving unit 110 sends out prompt information, for example, a second button light is on. After the rechecking operator P1 scans the goods, the system identifies the order corresponding to the goods and information of the storage location S, and corresponding button lights of the information prompting part are on. In the single-person operation mode, button lights corresponding to the scanning apparatus 300 to scan the goods are on. In the dual-person operation mode, the button light of the information prompting part corresponding to the scanning apparatus held by each rechecking operator P1 is on, the buttons of two information prompting parts may have different colors. For example, the first button light shows white and the second button shows green, or other colors are allocated. The button lights are on to prompt the storage locations S and quantity of the storage locations S corresponding to the goods.

Step S550: Place the goods to be rechecked at the storage location S corresponding to the information interaction apparatus 113 to send out the prompt information. After the information prompting part prompts the storage locations and quantity of the storage locations S corresponding to the goods corresponding to the scanned goods bar codes, the rechecking operator P1 places the goods at the corresponding storage locations S.

After the goods to be rechecked are placed at the storage locations S corresponding to the information interaction apparatus sending out the prompt information, verification information for verifying that the goods to be rechecked are placed at the storage location S from which the prompt information is sent out is sent to the controller 200. For example, in the single-person operation mode, one rechecking operator P1 presses the first button light corresponding to the information prompting part to acknowledge that the goods have been placed at the proper rechecking storage location S, next goods can be rechecked. In the dual-person operation mode, two rechecking operators P1 respectively press the button light of the information prompting part to acknowledge that corresponding goods have been placed at the proper storage location S, the next goods can be rechecked.

The foregoing operation is repeatedly performed before all goods listed in the rechecking task list are rechecked.

Step S560: After the goods to be rechecked listed in the rechecking task list are rechecked, the shelving unit 110 loaded with the goods to be rechecked is transferred to a packing zone.

Figure 18:
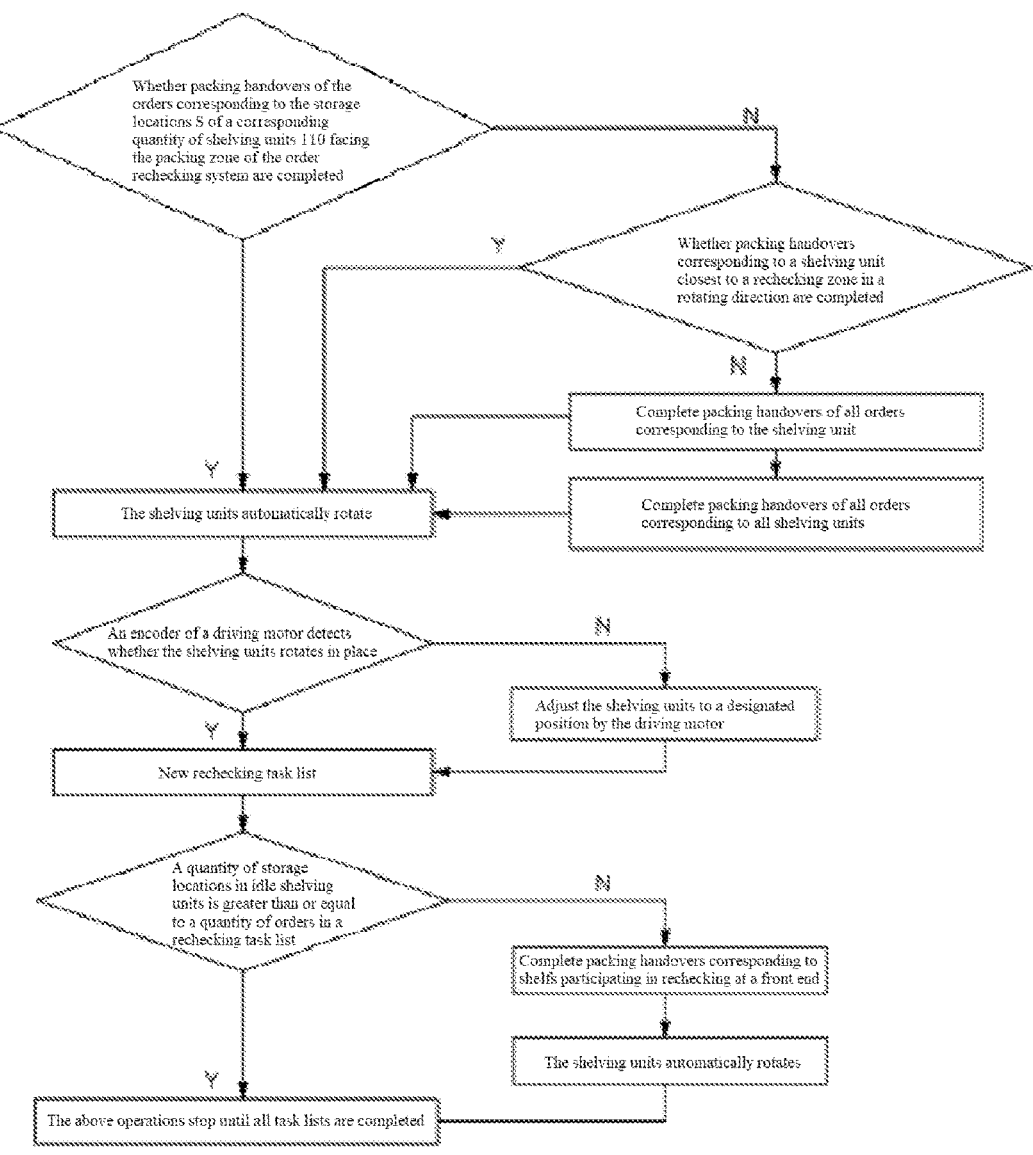
FIG. 18 is a flowchart of Step S560 in the order rechecking method according to an embodiment of the present disclosure.

As shown in FIG. 18, Step S560 includes: determine whether packing handovers of the orders corresponding to the storage locations S of a corresponding quantity of shelving units 110 facing the packing zone of the order rechecking system are completed.

A rechecking zone where the rechecking operator P1 operates and a packing zone where a packing operator P2 operates respectively have x shelving units 110, and a quantity of shelving units 110 required by the rechecking task list is t (t≤x). After the rechecking task list is completed, it is determined that whether packing handovers corresponding to the first t shelving units 110 in the packing zone close to the rechecking zone in a rotating direction are completed. Packing handover refers to whether an order is scanned in the packing zone; if scanning the order is completed in the packing zone, packing handover of the goods listed in the order is considered as having completed.

If packing handovers of the orders corresponding to the storage locations S in the corresponding quantity of shelving units 110 are completed, the order rechecking system automatically rotates the corresponding quantity of shelving units 110.

If not all packing handovers of the orders corresponding to the storage location S in the corresponding quantity of shelving units 110 are completed, it is determined that whether packing handovers corresponding to the shelving unit 110 closest to the rechecking zone in the rotating direction are completed; if packing handovers corresponding to the shelving unit 110 are completed, the shelf shifting apparatus 120 of the order rechecking system drives the shelving unit 110 to automatically rotate along the rail 122. If packing handovers corresponding to the shelving unit 110 are not completed, the packing operator P2 quickly completes packing handovers of all orders corresponding to the storage locations S of the shelving units 110, and the shelf shifting apparatus 120 of the order rechecking system drives the shelving units 110 to automatically rotate to a designated position along the rail 122 so as to provide an operable shelving units 110 for the rechecking operator P1. The foregoing operations are repeatedly performed to complete packing handovers of all orders corresponding to all shelves participating in rechecking.

When the shelving unit 110 automatically rotates, the encoder of the driving motor detects whether the shelving unit 110 rotates in place, which includes: the encoder of the driving motor detects whether the shelving unit rotates in place; if the shelving unit does not rotate in place, the driving motor is adjusted to the designated position through the controller; if the shelving unit rotates in place, a next operation can be performed.

Acquiring a task list information from a new rechecking task list is performed based on the foregoing operations.

It is determined that whether a quantity of storage locations in the idle shelving units 110 in the rechecking zone is greater than or equal to a quantity of the orders in the rechecking task list, the quantity of the orders in the rechecking task list is compared with the quantity of storage locations in the idle shelving units 110 in the rechecking zone. If a quantity of idle rechecking storage locations is greater than or equal to the quantity of the orders in the rechecking task list, the foregoing rechecking steps are performed before all operations are completed. If the quantity of idle rechecking storage locations is less than the quantity of the orders in the rechecking task list, packing handovers of the orders corresponding to the shelving units 110 are completed and the shelving units 110 are automatically rotated. The foregoing rechecking is performed until the quantity of storage locations in the idle shelving units 110 is greater than or equal to the quantity of the orders in the rechecking task list.

The rechecking is repeatedly performed until all rechecking task lists are rechecked.

The order checking method according to the embodiments of the present disclosure has advantages of the foregoing order rechecking device and order rechecking system.

Finally, it should be noted that the foregoing embodiments are merely intended to describe the technical solutions of the present disclosure, but not intended to constitute any limitation. Although the present disclosure is described in detail with reference to preferred embodiments, persons of ordinary skill in the art should understand that modifications can be made to the embodiments of the present disclosure or equivalent replacements may be made to some technical features therein. All such modifications or replacements shall fall within the scope of the technical solution claimed in the present application.

The invention claimed is:

1. An order rechecking system, comprising:
an order rechecking device comprising at least one shelving unit, wherein the shelving unit comprises:

a shelf comprising a plurality of storage locations for placing goods; and
a plurality of information interaction apparatuses that are in one-to-one correspondence to the plurality of storage locations, wherein the information interaction apparatus comprises two or more of interaction units configured to perform information interaction with the outside of the information interaction apparatus, and the interaction unit comprises a signal connection part configured to be in signal connection to a controller and an information prompting part configured to send out prompt information according to an instruction from the controller;
two or more of scanning apparatus configured to scan an identifier of goods to be rechecked to acquire goods identification information, wherein the two or more of scanning apparatuses are respectively corresponding to the two or more of interaction units in the information interaction apparatuses corresponding to the storage locations; and
a controller in signal connection to the information interaction apparatus and the two or more of scanning apparatus, wherein the controller is configured to: acquire task list information in a rechecking task list comprising a plurality of orders; match each of the plurality of orders in the rechecking task list with a storage location; and control the information prompting part of the interaction units corresponding to the scanning apparatuses which sends out the goods identification information of the information interaction apparatus corresponding to the storage location matching with the order listing goods to be rechecked according to the goods identification information to send out prompt information.

2. The order rechecking system according to claim 1, wherein the shelving unit further comprises a shelf identifier configured to identify the shelving unit; or
wherein the shelving unit further comprises a plurality of storage location identifiers, and the plurality of storage location identifiers are in one-to-one correspondence to the plurality of storage locations, and are configured to identify corresponding storage locations; or
wherein the shelving unit further comprises a shelf identifier configured to identify the shelving unit; and
wherein the shelving unit further comprises a plurality of storage location identifiers, and the plurality of storage location identifiers are in one-to-one correspondence to the plurality of storage locations, and are configured to identify corresponding storage locations.

3. The order rechecking system according to claim 1, wherein the order rechecking device further comprises a shelf shifting apparatus configured to drive the shelving unit to move along a predetermined route;
wherein the shelf shifting apparatus comprises:
a driving apparatus in driving connection to the shelving unit; and
a rail on which the shelving unit is arranged and along which the shelving unit is movable.

4. The order rechecking system according to claim 3, wherein the shelf shifting apparatus further comprises a transmission device, the transmission device is connected between the driving apparatus and the shelving unit, and the driving apparatus drives the shelving unit to move via the transmission device;
wherein the transmission device comprises:
a driving sprocket connected to the driving apparatus;

a driven sprocket, wherein a rotation axis of the driven sprocket and a rotation axis of the driving sprocket are spaced in parallel; and a transmission chain mounted on the driving sprocket and the driven sprocket and arranged along the rail, wherein the shelving unit is connected to the transmission chain.

5. The order rechecking system according to claim 3, wherein the shelf shifting apparatus comprises a suspension assembly, and the shelving unit is moveably suspended on the rail via the suspension assembly;

wherein the suspension assembly comprises a guide pulley fitting with the rail, and the shelving unit is suspended on the rail via the guide pulley.

6. The order rechecking system according to claim 1, wherein the scanning apparatus is further configured to scan a task list identifier of the rechecking task list to acquire the task list information, wherein the controller configured to acquire the task list information from the scanning apparatus.

7. An order rechecking method, comprising:

Step S510, acquiring, by a controller, task list information in a rechecking task list comprising a plurality of orders;

Step S520, matching, by the controller, each of the plurality of orders in the rechecking task list with a storage location;

Step S530, scanning, by a scanning apparatus, an identifier of goods to be rechecked to acquire goods identification information;

Step S540, controlling, by the controller, an information prompting part of an information interaction apparatus corresponding to the storage location matching with the order listing the goods to be rechecked according to the goods identification information to send out prompt information, wherein each of the information interaction apparatuses comprises two or more of interaction units, and each of the interaction units is corresponding to one of the scanning apparatuses, the controller controls the information prompting part of the information interaction apparatus corresponding to the interaction unit corresponding to the scanning apparatus which sends out the goods identification information to send out prompt information; and Step S550, placing the goods to be rechecked at the storage location corresponding to the information interaction apparatus which sends out the prompt information.

8. The order rechecking method according to claim 7, further comprising Step S500, scanning, by the scanning apparatus, a task list identifier of the rechecking task list to acquire the task list information, wherein in Step S510, the controller acquires the task list information from the scanning apparatus.

9. The order rechecking method according to claim 7, wherein Step S520 comprises:

Step S5201, determining, by the controller, a quantity of the orders in the rechecking task list;

Step S5202, acquiring, by the controller, shelf information acquired by scanning a shelf identifier of an idle shelving unit with the scanning apparatus;

Step S5203, checking a required quantity of shelving units and selecting the shelving units by the controller according to the quantity of the orders and a quantity of storage locations of the idle shelving unit corresponding to the shelf information; and Step S5204, matching, by the controller, each of the plurality of orders in the rechecking task list with a storage locations in the shelving unit selected.

10. The order rechecking method according to claim 9, wherein Step S5203 comprises:

Step S52031, determining whether a quantity of storage locations in the idle shelving unit is greater than or equal to a quantity of the orders in the rechecking task list;

under the condition that a determining result is no, performing Step S52032: waiting for more shelving units to release the goods, and then performing Step S52031;

under the condition that a determining result is yes, performing Step S52033: selecting the shelving unit.

11. The order rechecking method according to claim 9, wherein Step S5204 comprises the following steps:

Step S52041, scanning, by the scanning apparatuses, a storage location identifier corresponding to a storage location of the shelving unit selected to acquire storage location identification information; and Step S52042, matching, by the controller, each of the plurality of orders in the rechecking task list with the storage location according to the storage location identification information.

12. The order rechecking method according to claim 7, wherein each of the information interaction apparatuses comprises two or more of interaction units, and each of the interaction units is corresponding to one of the scanning apparatuses; in S540, the controller controls the information prompting part of the information interaction apparatus corresponding to the interaction unit corresponding to the scanning apparatus which sends out the goods identification information to send out prompt information.

13. The order rechecking method according to claim 7, wherein Step S550 further comprises: sending out, to the controller, verification information for verifying that the goods to be rechecked are placed at the storage location, from which the prompt information is sent out.

14. The order rechecking method according to claim 13, wherein after the goods to be rechecked are placed at the storage location corresponding to the information interaction apparatus sending out the prompt information, the verification information is sent out to the controller via the interaction unit which sends out the prompt information.

15. The order rechecking method according to claim 7, wherein regarding remaining goods to be rechecked in the rechecking task list, Step S530, Step S540, and Step S550 are respectively performed before the goods to be rechecked listed in the rechecking task list are rechecked.

16. The order rechecking method according to claim 7, further comprising Step S560, after the goods to be rechecked listed in the rechecking task list are rechecked, transferring the shelving unit loaded with the goods to be rechecked to a packing zone.

17. The order checking method according to claim 16, wherein Step S560 comprises: the shelf shifting apparatus comprising a driving motor, driving, by the driving motor, the shelving unit to move along the predetermined route; and detecting, by an encoder of the driving motor, whether the shelving unit reaches a designated position; if the shelving unit does not move to the designated position, controlling, by a motor controller, the driving motor to drive the shelving unit to reach the designated position; if the shelving unit reach the designated position, going to Step S510 to recheck orders in a new rechecking task list.

* * * * *